United States Patent Office 3,746,753
Patented July 17, 1973

3,746,753
α-HYDRAZINO-β-PHENYL ALKANOIC ACIDS AND THEIR DERIVATIVES
Sandor Karady, Elizabeth, Seemon H. Pines, Murray Hill, Manuel G. Ly, Edison, and Meyer Sletzinger, North Plainfield, N.J., assignors to Merck & Co., Inc., Rahway, N.J.
No Drawing. Filed June 24, 1970, Ser. No. 49,512
Claims priority, application Canada, Mar. 25, 1970, 78,423
Int. Cl. C07c 109/04
U.S. Cl. 260—519                                    2 Claims

ABSTRACT OF THE DISCLOSURE

A new method of preparing L-α-hydrazino-β-phenylalkanoic acids and their derivatives by reduction of various novel intermediate compounds is disclosed. The preparation of these novel intermediate compounds is also described.

---

This invention describes a new method of preparing certain α-hydrazino-β-phenylalkanoic acids and their derivatives. More particularly, it describes a method of preparing L-α-hydrazino-β-hydroxyphenylalkanoic acids and their derivatives. It further describes methods of preparing certain chemical compounds which are new and useful intermediates in the synthesis of the above compounds.

It is known in the art that various α-hydrazino-β-phenylalkanoic acids are useful as decarboxylase inhibitors. It is further known that the D-isomer of these acids is generally inactive and may even be antagonistic to the action of the L-form, thereby reducing its potency.

This invention describes novel and useful chemical compounds and to the process for their preparation. More particularly, this invention describes novel compounds which are intermediates in the preparation of L-α-hydrazino-β-phenylalkanoic acids and their derivatives.

The present invention provides a new method of preparing the L-stereoisomeric compounds of Formula I:

$$R-\underset{R-}{\overset{}{\bigcirc}}-CH-\underset{HNNH_2}{\overset{R_1}{\underset{R_3}{C}}}-R_2$$

I where

R is hydrogen or hydroxy;
$R_1$ is hydrogen or lower alkyl;
$R_2$ is hydrogen or lower alkyl; and
$R_3$ is carboxy, loweralkoxycarbonyl, metaloxcarbonyl or amido.

It is to be understood that the L-configuration is in reference to the absolute configuration on the α-carbon in relation to the hydrazine.

This invention further provides new methods of preparing valuable intermediate compounds which are useful in the preparation of the compounds of Formula I. These intermediate compounds are the L-stereoisomeric compounds of Formula II:

$$X-\underset{X-}{\overset{X_5}{\bigcirc}}-CH-\underset{X_4}{\overset{X_1}{\underset{X_3}{C}}}-X_2$$
$$\overset{|}{X_6}$$

II where

X is hydrogen, hydroxy, lower alkoxy, aralkoxy or keto;
X and X together are methylenedioxy;

$X_1$ is hydrogen, lower alkyl, hydroxy, lower alkoxy or acyloxy;
$X_2$ is hydrogen, lower alkyl, hydroxyloweralkyl, haloloweralkyl, mercaptoloweralkyl, loweralkylthioloweralkyl, acyloxyloweralkyl or tosyloxyloweralkyl;
$X_3$ is carboxy, loweralkoxycarbonyl, aralkoxycarbonyl, metaloxycarbonyl, organocatoxycarbonyl, amido or cyano;
$X_4$ is —NHNHR$_5$,
    —NHNR$_6$,
    —NNH$_2$,
       |
       R$_5$
    —NNHR$_5$,
       |
       R$_5$
    —NHNO,
    —N=NCH$_2$R$_7$,
    —N——CH—R$_7$,
       |      |
       NO$_2$ R$_8$
    —N——CHCOOH,
       |      |
       NO    R$_7$
    —$\overset{\oplus}{N}$=NCH$_2$R$_7$,
       |
       O$^\ominus$
    —N=$\overset{\oplus}{N}$CH$_2$R$_7$,
       |
       O$^\ominus$
    —N—NH$_2$
    R$_7$—CH
       |
       COOR$_5$ or $$-\overset{R_7}{\underset{N-O}{N \oplus \rightleftharpoons}}=O$$

where $X_5$ is hydrogen, lower acyl or aralkyl;
$R_6$ is aralkylidene (preferably o-phenylenedimethylene and naphthylene and biphenyl homologs);
$R_7$ is aryl;
$R_8$ is halogen; and
$X_5$ is hydrogen, halo, mercapto, loweralkylthio, aralkylthio or acylthio;
$X_1$ and $X_2$ together are methylene, thus forming a cyclopropyl ring; and
$X_3$ and $X_4$ together are —C=O              —C=O
   \O                \N
   |⊕|     or        |
   N——N             HNR$_5$
   |
   R$_7$—CH
      |
      COOR$_5$ where R$_5$ and R$_7$ are as described above.

We have found that the compounds of Formula I can be conveniently prepared by reducing the intermediate compounds of Formula II. These valuable products are prepared without any appreciable disturbing of the rest of the molecule.

We have also found that the intermediate compounds of Formula II can be conveniently prepared.

We have found that these intermediate compounds can be prepared in their desired L-stereoisomeric form.

We have further found that reduction of these L-stereoisomers can proceed smoothly to the desired L-stereoisomer of the final product and thereby eliminate costly and complicated separation procedures.

A more preferred embodiment of this invention describes the preparation of the L-stereoisomeric compounds of Formula III:

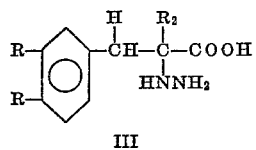

III where R and R₂ are as described above.

A most preferred embodiment of this invention describes the preparation of L-α-(3,4-dihydroxybenzyl)-α-hydrazinopropionic acid and L-β-(3,4-dihydroxyphenyl)-α-hydrazinopropionic acid.

In the above descriptive portions of Formulae I–III, the following definitions apply:

The "lower alkyl" radical signifies an alkyl group containing from 1 to about 6 carbon atoms which can be straight chained or branched.

The term "metal" refers to an alkali, alkaline earth or aluminum metal.

The term "organocatoxy" refers to any organic cation formed from a positively charged atom or radical such as cyclohexylamine, triethylamine, phenethylamine and the like. It is formed when these bases react with the carboxyl group to form salts of the structure given in the formula.

The "lower alkoxy" radical signifies an alkoxy group containing from 1 to about 6 carbon atoms which can be straight chained or branched.

"Aralkoxy" refers to an arylalkoxy group, the aryl portion of which may be one or more phenyl or naphthyl radicals attached to an α-alkoxy radical which contains from 1 to about 4 carbon atoms. The preferable aralkoxy groups are benzyl, diphenylmethyl, trityl, naphthylmethyl and substituted benzyl and the like groups. Such substituents may include lower alkyl such as o-methylbenzyl, lower alkoxy such as 3,4-veratryl and 4,4',4''-trimethoxytrityl and the like.

The "acyl" radical may be any organic radical derived from an organic acid by the removal of the hydroxyl group. It includes such radicals derived from carboxylic acids, sulfonic acids and the like.

"Aryl" refers to phenyl, naphthyl and substituted phenyl which may be lower alkyl or lower alkoxy substituents.

Each reductive method of preparation is described by the specific reaction equation. For simplicity, when the preparation involves only the hydrazino-acid portion of the molecule, it is exemplified by only that part of the molecule in the reaction equation and it is to be understood that the remaining benzyl portion of the molecule remain intact:

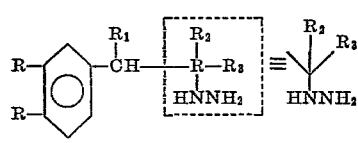

where R, R₁, R₂ and R₃ are as described above, unless otherwise stated.

The following reactions describe the various methods of preparation of the compounds of this invention.

(A) Removal of protective groups (a) Reduction to form the hydrazine moiety.—The reduction of various N-substituted hydrazino-acids and their derivatives results in the desired hydrazino-acid or derivative. Reduction may be carried out using transition group methods as catalysts. Such substituents which may be removed by catalytic reduction include benzyl, trityl, diphenylmethyl, naphthylmethyl and substituted benzyl and the like groups. Such substitutes may include alkyl such as o-methylbenzyl, alkoxy such as 3,4-veratryl, and 4,4',4''-trimethoxytrityl and the like.

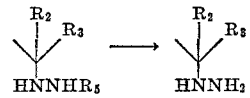

where R₅ is aralkyl.

A Schiff base can be prepared by condensing an α-aminoacid ester with benzaldehyde in the presence of dicyclohexylcarbodiimide. Nitrene generated in situ can then add to this to prepare the hydrazino ester. When the ester group present is easily reduced (such as benzyl) the hydrazinoacid may be directly prepared.

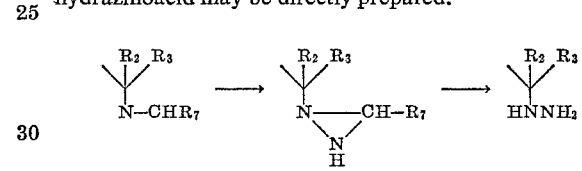

A Schiff base may also be formed using diphenylketone, diaralkylketone or an aralkylaldehyde in the presence of an aminohalide or an aminoester halide.

Alternatively, a pseudehalide such as iodoazide, iodothiocyanate, iodocyanate, iodonitrite and the like can be added to the Schiff base of above. Reduction by zinc in acetic acid followed by catalytic reduction with hydrogen and an active catalyst yields the hydrazinoester. When the ester group is easily reduced, the hydrazinoacid may be directly prepared.

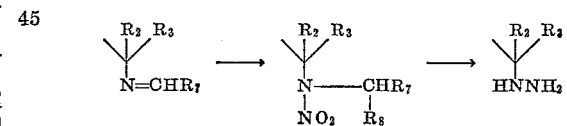

Catalytic reduction with hydrogen over Raney nickel or an active catalyst on the sydnone-ester or sydnone-acid results in the desired hydrazinoester or hydrazinoacid. When the ester group present is one that is easily reduced, the sydnone-ester may be directly reduced to the hydrazinoacid. The sydnone may be prepared by condensing an ester of the aminoacid with chlorophenylacetic acid in the presence of a hydrogen chloride acceptor. This intermediate may then be nitrosated and cyclized to the sydnone.

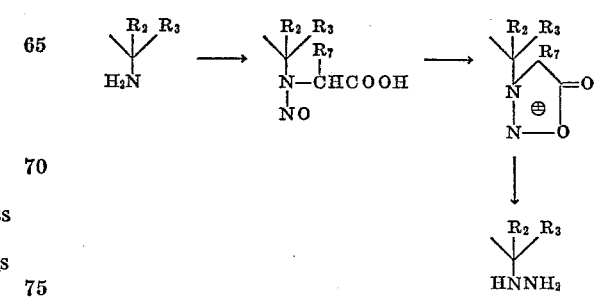

The α-alkyl aminoacid ester may be nitrosated in the usual way to the α-alkyl nitrosoamino-ester. Reduction using zinc catalyst results in the desired α-alkyl hydrazino-ester. When the ester group present is one that is easily hydrolyzed to the α-alkyl nitrosoamino-acid which may then be reduced to the α-alkyl hydrazinoacid as above. When the ester group present is one that is easily removed by reduction (such as benzyl) the α-alkyl nitrosoamino-ester may be directly reduced to the α-alkyl hydrazinoacid.

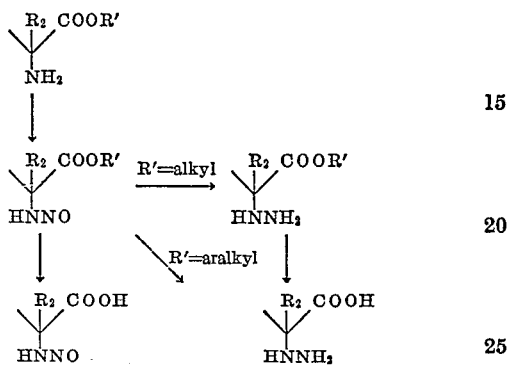

where $R_2$ is alkyl and $R'$ is alkyl and aralkyl.

Other groups that may be catalytically reduced to the hydrazino compound are the aralkylazo and aralkylazoxy compounds. This reduction may be carried out with the acid or ester compounds. These compounds may be formed from the corresponding nitroso-, nitro- or amino-acid or -ester.

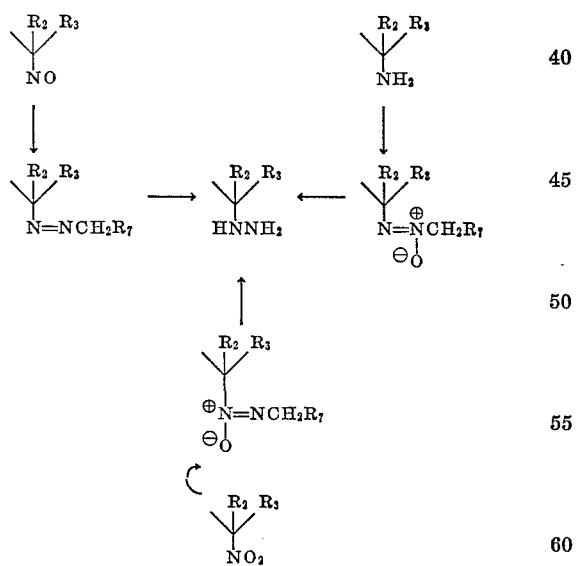

In a Friedel-Crafts reaction 1,2-dialkoxybenzene may be condensed with L-$N^1$-acyl-$N^2$-phenylenedimethylene-hydrazino - α - methylpropiolactone in the presence of aluminum chloride. The alkoxy and acyl groups may then be removed with hydrobromic acid (preferably at raised temperature). The phenylenedimethylene group is then removed by hydrogenation with a solid phase metal catalyst to obtain the desired hydrazine. If the alkoxy groups are replaced by aralkoxy groups, they may be removed simultaneously at the last step, if desired, to the hydroxy compounds. The above hydrogenation may also be carried out on the desired ester.

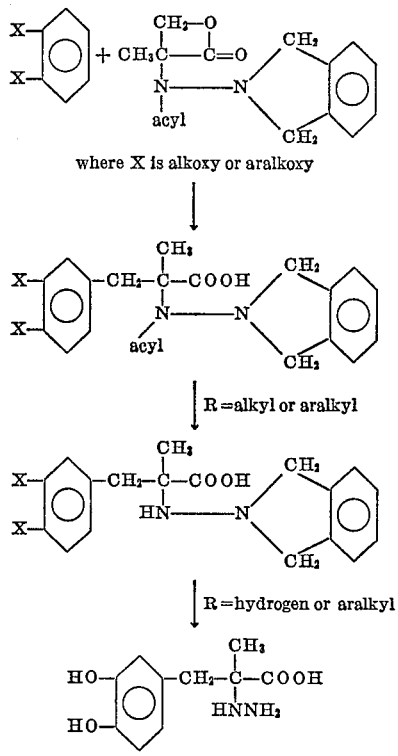

(b) Reduction to form the acid moiety.—The reduction of various hydrazino-esters results in the hydrazino-acid compound. Reduction is preferably carried out using a solid phase metal catalyst. Such ester substituents which may be removed catalytically include benzyl, diphenylmethyl, trityl, naphthylmethyl and substituted benzyl and the like groups. Such substituents may include alkyl such as α-methylbenzyl, alkoxy such as 3,4-veratryl and 4,4', 4"-trimethoxytrityl and the like.

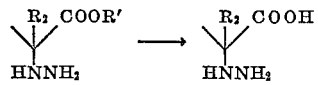

where $R'$ is aralkyl.

(c) Reduction to form the 3,4-dihydroxy moiety.—Reduction to the 3,4-dihydroxy groups can be carried out on various 3,4,O-substituted compounds. This reduction is preferably carried out using a solid phase metal catalyst on O-benzyl, O-diphenylmethyl, O-trityl, O-naphthylbenzyl and substituted O-benzyl and the like groups as above.

(d) Reduction of two or more moieties.—Simultaneous reduction may be carried out on more than one of the above moieties when one or more of the above groups are present in the compound. Thus, for example, benzyl L-α-(3,4-dibenzyloxybenzyl) - α - N-benzylhydrazinopropionate may be catalytically reduced to L-α-(3,4-dihydroxybenzyl)-α-hydrazinopropionic acid. Again, L-3-(α-carbomethoxy - α - [3',4' - ditrityloxybenzyl])ethyl-4-phenylsydnone may be catalytically reduced as above to methyl L-α-(3,4-dihydroxybenzyl)-α-hydrazinopropionate.

(B) Reduction of a double bond

When a double bond exists in the side chain, this may be hydrogenated over an optically active catalyst and crystallized to constant rotation to obtain the desired product. Thus, for example, α-N-benzylhydrazino-3,4-dibenzyloxycinnamic acid can be hydrogenated in methanol over Raney nickel on lactose at 1–3 atmospheres and room temperature to yield preponderantly L-β-(3,4-dihydroxyphenyl)-α-hydrazinopropionic acid.

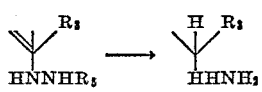

Further, benzyl β-(3,4-benzyloxyphenyl)-α-hydrazonopropionate may also be treated in the same manner as above to give preponderantly L-β-(3,4-dihydroxyphenyl)-α-hydrazinopropionic acid.

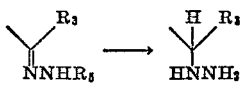

(C) Removal of groups by reduction (a) From the phenyl moiety.—The removal of various substituents on the benzene ring can be accomplished by reductive methods. Such groups as halogen, mercapto, alkylthio, aralkylthio, acylthio and the like may be removed by hydrogenation using an active catalyst.

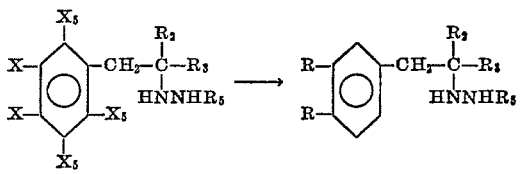

When X is benzyloxy, $R_5$ is benzyl and $R_3$ is benzyloxycarbonyl, the product obtained is β-(3,4-dihydroxyphenyl)-α-hydrazinopropionic acid.

(b) Reduction of a quinone.—Reduction of quinone may be carried out on an α-benzoquinoyl moiety to obtain the o-dihydroxyphenyl moiety. The hydrazino group of the side chain must be protected since this is not capable of existing in the presence of the α-benzoquinonyl moiety. The reducing agent employed must be one having sufficient reducing potential to reduce the α-benzoquinonyl moiety without causing other changes in the molecule. The α-benzoquinone is in tautomeric equilibrium with the 3-hydroxyquinonemethide. The o-quinone may be reduced by chemical methods such as sulfur dioxide in water, zinc and dilute acetic acid, sodium hydrosulfite and other mild reducing agents. When the benzyl protective group is employed on the hydrazino group this may also be reduced off simultaneously.

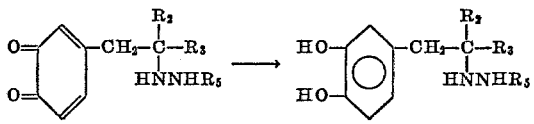

(c) From the side chain.—Removal of various groups from the β-position of the side chain may be carried out reductively. Such groups as β-hydroxy, β-alkoxy or β-acyloxy may be removed using red phosphorous and hydriodic acid. The β-hydroxy group may also be converted to a β-chloro or β-bromo with phosphorous trihalide and either in turn to β-iodo with potassium iodide in alcohol, whereupon reduction with red phosphorous and hydriodic acid may proceed as before.

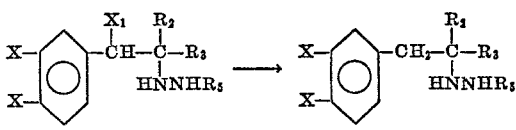

where $X_1$ is hydroxy, alkoxy or acyloxy. When X is benzyloxy, $R_5$ is benzyl and $R_3$ is benzyloxycarbonyl, the product obtained is β-(3,4-dihydroxyphenyl)-α-hydrazinopropionic acid.

(d) Formulation of the α-alkyl group.—Various α-substituted compounds can be reduced to the desired α-alkyl products of this invention. When the α-substituent is hydroxyalkyl this can be reduced to the α-alkyl product with red phosphorous and hydriodic acid. The chloroalkyl and bromoalkyl groups can be converted to iodoalkyl by use of potassium iodide in alcohol. The mercaptoalkyl and alkylthioalkyl substituents may be desulfurized by the use of Raney nickel. Further, acetoxyalkyl or other acyloxy groups can first be hydrolyzed and alcohol treated as above or metathesized via the tosylate to the iodoalkyl which can then be treated with red phosphorous and hydriodic acid to the desired α-alkyl product. Depending on the desired end-product, the above reactions may be carried out on the ester and/or the substituted hydrazino compound. If the desired product is the α-alkyl acid and/or the free hydrazine, the starting material may have one or more groups present (such as benzyl) which can be removed simultaneously when the reduction of the α-substituent is carried out.

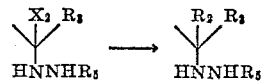

where $X_2$ is hydroxyalkyl, haloalkyl, mercaptoalkyl, alkylthioalkyl, acyloxyalkyl or tosyloxyalkyl; and $R_2$ is alkyl.

(D) Ring cleavage of the side chain

β-3,4-diaralkoxyphenyl-α - hydrazinocyclopropane carboxylic acid can be prepared from cis-trans-α-hydrazino-3,4-diaralkoxycinnamic acid with methylene iodide and zinc. This cyclopropane acid, when converted to the methyl ester, can be resolved as the L-menthyloxyacetal derivative. The methyl ester and menthyloxyacetal groups can then be removed by acid hydrolysis. The aralkoxy groups and cyclopropane ring are then cleaved by hydrogenation over finely divided transition metals, preferably Raney nickel. When the benzyl ester is prepared in place of the methyl ester, the benzyl ester group may be removed by hydrogenation at the final step. When it is desired to obtain a final product which is the ester or substituted hydrazine, the desired substituents may be carried through the reaction sequence.

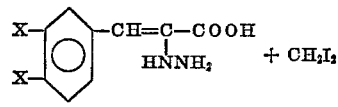

where X is aralkoxy

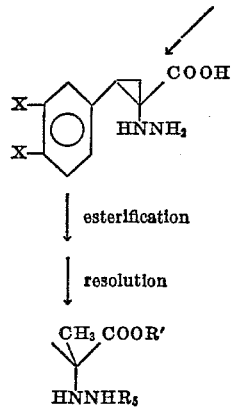

When DL-3,4-diaralkoxylphenylalanine is condensed with an alkyl D-α-chlorophenylacetate in the presence of pyridine as a hydrogen chloride acceptor, the N-(α-arylacetate) derivative is obtained. It is preferable to use the isopropyl ester. The L-adduct may then be nitrosated and converted to the L-sydnone in the usual way with dicyclohexylcarbodiimide. Hydrogenation of the L-sydnone with Raney nickel results in the L-β-(3,4-dihydroxyphenyl)-α-hydrazinopropionic acid.

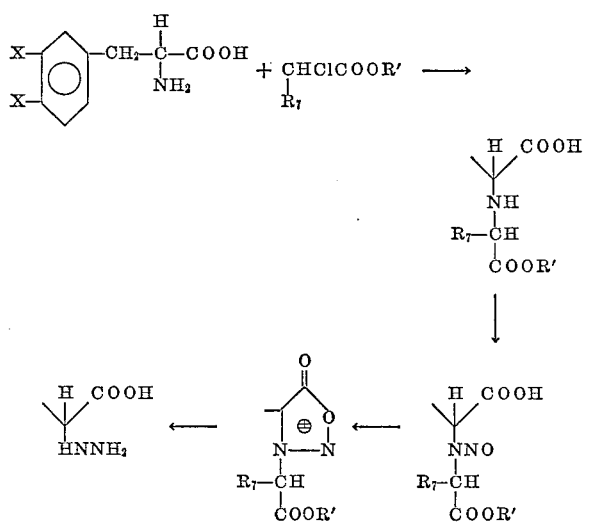

where R' is alkyl.

Any combination sequence of the above reductive reactions is also considered to be a part of this invention. Thus, for example, L-3-[α-(3',3-quinonylmethyl)-α-benzyloxycarbonyl]ethyl-4-phenylsydnone may be hydrogenated over Raney nickel to L-(3,4-dihydroxybenzyl)-α-hydrazinopropionic acid.

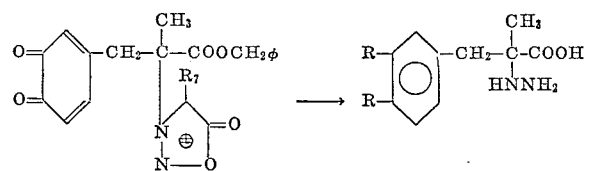

It is preferred that the hydrogenation of this invention be carried out at a sufficiently elevated temperature and over a sufficient time to form the desired end-products and add hydrogen. The reaction is preferably carried out at a temperature which is high enough so that hydrogenation takes place readily. The reaction temperatures can vary from below room temperature to about 300° C., although it is preferable to run the reaction at temperatures from about —20° C. to 150° C.

It is also preferred that the invention take place in an inert solvent. Any organic solvent which would not cause adverse side-effects to take place can be employed. It is most preferable to use a solvent which would boil low enough to be easily removed from the product. A solvent can be selected by first determining the particular reaction temperature desired and then choosing a solvent which will reflux at about that temperature and at 1 atmosphere. Typical solvents which can be used are alcohols, dimethylsulfoxide, methylcellulose, benzene, mono- and dialkylbenzene, dioxane, cyclohexane, naphthalene, diglyme, triglyme, etc.

The amount of catalyst employed should be sufficient to cause this hydrogenation to proceed. An excess is preferably employed to insure a good yield of product.

The reaction is usually carried out at 1-3 atmospheres, however higher pressure may also be used.

Once the desired products are prepared, they can be isolated from the reaction mixture by conventional methods known in the art. One such method would involve filtering the cooled reaction mixture, evaporating and separating the product by extraction or chromatography. The product formed can then be purified by recrystallization from an appropriate solvent.

The use of several heterogeneous catalysts that may be employed include such catalysts as (a) solid phase metal catalysts (such as platinum, palladium, rhodium, ruthenium, etc.);
(b) active catalysts containing a metal catalyst on a suitable carrier (such as 5-10% of a platinum metal on carbon, 5-10% palladium-on-diatomaceous earth, or other finely divided material);
(c) Raney nickel.—Other reductive methods employed will become apparent to one skilled in the art.

The starting materials of this invention are known or a reference to their preparation is included.

The following examples show the preparation of the products of this invention. They are to be construed as illustrative of the invention and not as limitations thereof.

EXAMPLE 1

To L-α-(3,4-dihydroxybenzyl)-α-ureidopropionic acid [J. Med. Chem., 7, 379 (1964)] (25.4 g., 0.1 mole) in 150 ml. of methanol is added 16.74 g. (0.31 mole) of sodium methylate. With stirring 23.32 g. (0.2 mole) of benzyl chloride is added dropwise and the mixture refluxed for 4 hours. Water (200 ml.) is added and the mixture is distilled until the boiling point reaches 95-98° C. By addition of hydrochloric acid the pH of the mixture is adjusted to 3.5, the volume adjusted to 200 ml. by addition of water and the mixture refluxed for 2 hours additional. After water is removed in vacuo, the mixture is extracted with methanol and the methanol extract chromatographed over silica gel. The eluate is concentrated to obtain L-α-(3,4-dibenzyloxybenzyl)-α-ureidopropionic acid.

To an ice-cold mixture of the hydantoic acid of the previous step (21.78 g., 0.05 mole) in 100 ml. of 2.5 N sodium hydroxide is added to a solution of sodium hypochlorite (89.5 ml., 0.70 N, 0.0625 mole). After the addition is completed, the mixture is stirred for 5 minutes at 0-5° C. The mixture is then heated to 80° C. and maintained at 80° C. for 1.5 hours. At the end of this period, 300 ml. of toluene and 4 ml. of 85% hydrazine hydrate are added and the mixture vigorously agitated while 54 ml. of concentrated hydrochloric acid is added. The mixture is stirred at 80° C. for 30 minutes, the phases separated and the aqueous phase washed with 150 ml. of toluene. The aqueous phase is evaporated to dryness, the residue extracted with methanol and the pH of the extract adjusted to 6.4 with diethylamine. The product is separated by filtration and recrystallized from methanol-water to obtain L-α-(3,4-dibenzyloxybenzyl)-α-hydrazinopropionic acid. A solution of L-α-(3,4-dibenzyloxybenzyl)-α-hydrazinopropionic acid (8.13 g., 0.02 mole) in 200 ml. of acetic acid is hydrogenated over 0.5 g. of 5% palladium on charcoal at room temperature and 3 atm. pressure. The catalyst is removed by filtration, washed and the filtrate concentrated to yield L-α-(3,4-dihydroxybenzyl)-α-hydrazinopropionic acid, M.P. 208° C. dec.

When benzyl chloride in the above example is replaced by diphenylmethylchloride, trityl bromide, α-naphthylmethyl bromide, o-tolyl chloride, 3,4-veratyl bromide or 4,4',4''-trimethoxytrityl bromide, the corresponding L-α-(3,4-disubstitutedbenzyl)-α-hydrazinopropionic acid is prepared which is then reduced to L-α-(3,4-dihydroxybenzyl)-α-hydrazinopropionic acid.

EXAMPLE 2

L-α-amino-α-(3,4-dibenzyloxybenzyl)-propionic acid hydrochloride salt (44.1 g., 0.1 mole is slurried in benzene (300 ml.) and 10.1 g. (0.1 mole) of triethylamine is added dropwise with cooling to 10-15° C. After addition of 10.6 g. of benzaldehyde, 20.6 g. (0.1 mole) of dicyclohexylcarbodiimide in 25 ml. of benzene is added and the mixture stirred 18 hours at room temperature with the exclusion of moisture. The mixture is filtered, washed and the filtrate concentrated in vacuo.

To the resulting Schiff base in 100 ml. of ether containing 0.1 mole of ammonia is added 0.1 mole of chloramine ca. 0.35 N in ether. After a short time ammonium chloride begins to separate. The mixture is allowed to stand overnight, filtered and the precipitate washed with ether. The ethereal solution is partially concentrated in vacuo, extracted with water, the ethereal extract dried ($K_2CO_3$), filtered and concentrated in vacuo. A solution of L-α-(3,4-dibenzyloxybenzyl)-α-3-(phenyldiaridinyl)-propionic acid acid (9.89 g., 0.02 mole) in acetic acid (200 ml.) is hydrogenated over 0.7 g. of 5% palladium on charcoal at room temperature (25° C.) and 3 atm. pressure. The catalyst is removed by filtration, washed and the filtrate taken to dryness in vacuo. The residue is crystallized from water to obtain L-α-(3,4-dihydroxybenzyl)-α-hydrazinopropionic acid, M.P. 208° C. dec.

When dibenzylketone, diphenylketone or α-phenyl acetaldehyde are used in place of benzaldehyde in the above procedure, the corresponding Schiff base is prepared which is then reduced to L-α-(3,4-dihydroxybenzyl)-α-hydrazinopropionic acid.

When methyl L-α-amino-α-(3,4-dibenzyloxybenzyl)-propionate or L-α-amino-β-(3,4-dibenzyloxyphenyl)propionic acid are used in place of L-α-amino-α-(3,4-dibenzyloxybenzyl)propionic acid, the product obtained is methyl L-α-(3,4-dihydroxybenzyl)-α-hydrazinopropionate or L-β-(3,4-dihydroxyphenyl)-α-hydrazinopropionic acid.

EXAMPLE 3

To L-α-benzylideneamino-α-(3,4-dimethoxybenzyl)-propionic acid, methyl ester (34.14 g., 0.1 mole) in ether (500 ml.) and under nitrogen, is added silver nitrate (22.1 g., 0.13 mole) and iodine (33.0 g., 0.13 mole). The mixture is stirred at room temperature (25° C.) for 18 hours, filtered, the precipitate washed with ether and the ethereal filtrate washed with ice-cold dilute sodium bisulfite. The ethereal solution is dried (sodium sulfate) and concentrated to dryness in vacuo to obtain L-α-(3,4-dimethoxybenzyl)-α-N-α'-iodobenzyl-N-nitrolanine methyl ester. A mixture of zinc dust (26.2 g., 0.4 mole) and water (100 ml.) is cooled to 10° C. and to it is added with stirring and while maintaining the temperature at 10–15° C., the ester from the previous step (51.4 g., 0.1 mole) dissolved in acetic acid (200 ml.) is added. After addition is ended, the mixture is slowly warmed to 25° C. over an hour an then to 80° C. on the steam-bath. The mixture is cooled to 35° C., filtered to remove unreacted zinc. The precipitate is washed with three 25 ml. portions of warm 2 N hydrochloric acid and the combined filtrate is heated at reflux for 3 hours. The mixture is cooled to 20° C., basified with sodium hydroxide to pH 6.5, filtered, washed and the precipitate dried in air. The solid is extracted with three 200 ml. portions of chloroform, dried (magnesium sulfate) and the extract concentrated to dryness in vacuo. The residue is recrystallized from methanol-water to obtain L-α-(3,4-dimethoxybenzyl)-α-N¹-benzylhydrazinopropionic acid.

The acid from the previous step (10.75 g., 0.03 mole) is refluxed for 2 hours with constant boiling hydrobromic acid (50 ml.). The mixture is concentrated to dryness in vacuo, flushed with t-butanol and dried to yield crude L-α-(3,4-dihydroxybenzyl)-α-N¹-benzylhydrazinopropionic acid hydrobromide salt.

The salt from the previous step is dissolved in 200 ml. of acetic acid and hydrogenated over 1.0 g. of 5% palladium-on-charcoal at room temperature and 3 atmospheres pressure. The mixture is vented, filtered, the precipitate washed and the combined filtrates taken to dryness in vacuo. The residue is dissolved in methanol and the mixture brought to pH 6.5 by addition of diethylamine, L-α-(3,4-dihydroxybenzyl)-α-hydrazinopropionic acid is separated by filtration and recrystallized from water containing 0.5% sodium bisulfite, M.P. 208° C. dec.

When L-α-benzylideneamino-β-(3,4-dimethoxyphenyl)-propionic acid methyl ester is used in the above example, the product prepared is L-β-(3,4-dihydroxyphenyl)-α-hydrazinopropionic acid.

EXAMPLE 4

To a solution of L-α-amino-α-(3,4-dibenzyloxybenzyl) propionic acid [J. Org. Chem., 29, 1424 (1964)] (39.1 g., 0.10 mole) in 50 ml. of methyl alcohol is added gaseous hydrogen chloride until the saturation point is reached. The mixture is stirred at room temperature for 24 hours, then concentrated to dryness.

To the residue dissolved in 100 ml. of methanol is added with cooling 20.2 g. (0.2 mole) of triethylamine and 17.06 g. (0.1 mole) of α-chlorophenylacetic acid. The mixture is heated at reflux for 5 hours, cooled to 10° and acidified to pH 3.5 with 6 N hydrochloric acid. The mixture is concentrated in vacuo to remove methanol, the residue diluted with water and extracted with chloroform. After drying over magnesium sulfate, the chloroform is removed in vacuo and the residue crystallized from acetone-hexane.

To a slurry of 30 g. (0.05 mole) of intermediate from the previous step in 150 ml. of water is added 4.25 ml. of concentrated hydrochloric acid and 500 ml. of ether. The mixture is cooled to 0° C. and 3.8 g. (0.055 mole) of sodium nitrite in 10 ml. of water is added dropwise over 30 minutes. Stirring at 0° C. is continued for 3 hours. The ether layer is separated and the aqueous layer is extracted with ether. The combined ethereal extract is extracted with saturated salt solution and the ethereal solution dried over magnesium sulfate and concentrated in vacuo. The residue is dissolved in 500 ml. of benzene and 10.3 g. (0.05 mole) of dicyclohexylcarbodiimide in 140 ml. of benzene added. The mixture is heated with stirring at 50–60° C. for 2 hours, filtered hot and washed with benzene. The filtrate is cooled to room temperature, washed with water, dried and concentrated in vacuo. The residue is recrystallized from acetone-hexane to yield L-3-[α-benzyloxycarbonyl-α-(3′,4′-dibenzyloxybenzyl)]ethyl-4-phenylsydnone.

To a solution of 31.9 g. (0.05 mole) of the foregoing sydnone in 250 ml. of benzene and 50 ml. of glacial acetic acid is added 1.5 g. of Raney nickel. The mixture is hydrogenated at room temperature until the uptake is 0.3 mole. The mixture is warmed to 60° C., filtered and washed. The combined filtrate is diluted with water and brought to pH 7 by addition of 40% sodium hydroxide with stirring and cooling. The layers are separated, the aqueous layer extracted with benzene, the combined benzene extracts dried over magnesium sulfate and concentrated to dryness in vacuo to obtain L-α-(3,4-dihydroxybenzyl)-α-hydrazinopropionic acid (M.P. 208° C. dec.).

When L-α-amino-β-(3,4-benzyloxyphenyl)propionic acid or L-α-amino-β-(3,4-dimethoxyphenyl)propionic acid is used in place of L-α-amino-α-(3,4-dibenzyloxybenzyl)-propionic acid in the above example, the product obtained is L-β-(3,4-dihydroxyphenyl)-α-hydrazinopropionic acid.

EXAMPLE 5

To a mixture of 23.9 g. (0.1 mole) of L-α-methyl-3,4-dibenzyloxyphenylalanine [J. Org. Chem., 29, 1424 (1964)] in 200 ml. of 75% acetic acid at 0–10° C. is added 10.35 g. (0.15 mole) of sodium nitrite in 20 ml. of water. When the addition is complete, the mixture is stirred for 4 hours at 5 to 10° C. Zinc dust (52.4 g., 0.8 mole) is added with stirring while maintaining the temperature between 10 and 15° C. After the addition is finished, the mixture is allowed to warm to room temperature over an hour and then warmed to 80° C. on the steam-bath. The mixture is filtered to remove unreacted zinc and the precipitate washed with three 25 ml. portions of warm 2 N hydrochloric acid. The combined filtrate is cooled to room temperature and with cooling basified to pH 6.5. The mixture is filtered and the preicipitate dried. The residue is extracted with three 200 ml. portions of chloroform. The dried magnesium sulfate extract is concentrated in vacuo to a residue which is recrystallized from methanol to yield L-α-(3,4 - dibenzyloxybenzyl)-α-hydrazinopropionic acid. This material is hydrogenated as in Example 2 to yield L-α-(3,4-dihydroxybenzyl)-α-hydrazinopropionic acid (M.P. 208° C.).

When the methyl ester of L-α-methyl-3,4-dibenzyloxyphenylalanine is used in place of the acid in the above procedure, the product obtained is methyl L-α-(3,4-dihydroxybenzyl)-α-hydrazinopropionate.

EXAMPLE 6A

L-α-methyl-3,4 - dihydroxyphenylalanine sesquihydrate [J. Org. Chem. 29, 2503 (1964)] (119.1 g., 0.5 mole), phenylnitrosomethane dimer (60.57 g., 0.25 mole) and 500 ml. of toluene are placed in a flask and refluxed. By means of a Dean-Stark separator, water is azeotroped away and toluene is returned to the flask. When the theoretical amount of water (1.25 moles) is distilled, L-α-(benzylazo)-α-(3,4 - dihydroxybenzyl)propionic acid is obtained on concentration of the mixture to dryness in vacuo at a temperature <50° C.

The acid (31.4 g., 0.1 mole) in 300 ml. methanol containing 3 g. polyvinyl alcohol-20, 1 g. platinum oxide and 3 g. vanadium (II) chloride is hydrogenated at 1 atm. pressure and 80° C. until the uptake of hydrogen is 0.3 mole. The mixture is cooled to room temperature, filtered, the precipitate washed and the filtrate taken to dryness in vacuo. The residue is recrystallized once from water and a second time from water containing 0.5% sodium bisulfite to yield L-α-(3,4-dihydroxybenzyl)-α-hydrazinopropionic acid, M.P. 208° C. dec.

EXAMPLE 6B

L-α-methyl-3,4 - dihydroxyphenylalanine sesquihydrate (119.1 g., 0.5 mole), phenylnitromethane (68.57 g., 0.5 mole) and 500 ml. of toluene are placed in a flask and refluxed. The condensate is passed through a Dean-Stark separator such that water is removed and toluene is returned to the flask. L-α-(3,4-dihydroxybenzyl)-α-phenylazoxypropionic acid need not be isolated. To the mixture is added 1.5 g. of platinum oxide and the mixture is hydrogenated at 1 atm. of hydrogen and room temperature until the uptake is 1.5 moles of hydrogen (in addition to that needed to reduce the platinum oxide). The mixture is concentrated to dryness in vacuo and the residue extracted with hot methanol and filtered. The methanolic filtrate is concentrated to dryness in vacuo and the residue crystallized from water containing alkali-metal bisulfite to yield L-α-(3,4-dihydroxybenzyl)-α-hydrazinopropionic acid, M.P. 208° C. dec.

When L-β-(3,4-dihydroxyphenyl)alanine is used in place of L-α-methyl-3,4-dihydroxyphenylalanine in the above procedures, the product prepared is L-β-(3,4-dihydroxyphenyl)-α-hydrazinopropionic acid.

EXAMPLE 7

To L-O,N-diacetyl-α-methylserine [Chem. Pharm. Bull. (Japan), 15, 1776 (1967)] (101.6 g., 0.5 mole) in 500 ml. of pyridine is added N-chloroisoindoline (77 g., 0.5 mole) and the mixture is refluxed for 5 hours. The mixture is concentrated to dryness in vacuo, taken up in chloroform-water and washed with dilute hydrochloric acid, water and saturated salt solution. The chloroform phase is dried over sodium sulfate, concentrated to dryness in vacuo and the residue recrystallized from methanol-water to yield L-α-N¹-acetyl-N²-phenylenedimethylenehydrazino-α-methyl-O-acetoxypropionic acid.

The acid from the previous step (139.3 g., 0.4 mole) is refluxed with 100 ml. of acetic acid and 900 ml. of 1 N hydrochloric acid for 3 hours. The mixture is cooled to room temperature, washed and dried at 50° C. in vacuo to yield L-α-N¹-acetyl-N² - phenylenedimethylenehydrazino-α-methylhydracrylic acid.

The acid from the previous step (92.0 g., 0.3 mole) and dicyclohexylcarbodiimide (66.0 g., 0.32 mole) in 500 ml. of benzene are stirred at room temperature for 24 hours. The mixture is filtered, water added to the filtrate and the benzene phase successively washed with 5% sodium bicarbonate, water and saturated salt solution. The benzene phase is dried over magnesium sulfate and concentrated in vacuo and the residue recrystallized from ethyl acetate-n-hexane to yield L-α-N¹-acetyl-N²-phenylenedimethylenehydrazino-α-methylpropiolactone.

To the lactone from the previous step (57.56 g., 0.2 mole) and veratrole (182.3 g., 1.32 moles) is added all at once 100 g. (0.75 mole) of aluminum chloride. The mixture is heated at 80° C. for 4 hours, poured over ice and extracted with ether. The ethereal solution is extracted 3 times with cold 1 N sodium hydroxide. The aqueous phase is acidified with concentrated hydrochloric acid and extracted with ether, the ether extract washed with water, dried over sodium sulfate and concentrated in vacuo. The residue is crystallized from methanol-water to yield L-α-(N¹-acetyl-N²-phenylenedimethylenehydrazino)-α-(3,4-dimethoxybenzyl)propionic acid.

A mixture of L-α-(N¹-acetyl-N²-phenylenedimethylenehydrazino)-α-(3,4-dimethoxybenzyl)propionic acid (37.8 g., 0.1 mole) and 500 ml. of concentrated hydrochloric acid is heated in a sealed tube at 120° C. for two hours. The resulting mixture is evaporated to dryness in vacuo and the product leached out with ethanol. The hydrazino acid is precipitated by addition of diethylamine to pH 6.4, the mixture filtered and the precipitate washed with ethanol and dried to yield L-α-(N²-phenylenedimethylenehydrazino)-α-(3,4-dihydroxybenzyl)propionic acid.

The residue from above (32.84 g., 0.1 mole) is dissolved in 400 ml. of methanol and hydrogenated over 5% palladium-on-barium sulfate at 3 atmospheres and 80° C. The mixture is cooled, filtered, the precipitate washed with methanol and the filtrate concentrated in vacuo. The residue is recrystallized from water containing 0.5% sodium bisulfite to yield L-α-(3,4-dihydroxybenzyl)-α-hydrazinopropionic acid (M.P. 208° C. dec.).

When L-O,N-diacetylserine is used in place of L-O,N-diacetyl-α-methylserine in the above example, the product obtained is L-β-(3,4-dihydroxyphenyl)-α-hydrazinopropionic acid.

EXAMPLE 8

Hydrazinium cis-trans 3,4-dibenzyloxy-α-hydrazinocinnamate (42.25 g., 0.1 mole) in methanol (200 ml.) is hydrogenated at room temperature (25° C.) and 3 atmospheres over 1.0 g. of 25% palladium-on-silk [prepared according to Akibori et al., Nature 178, 323 (1956)] until the uptake is 0.3 mole of hydrogen. The mixture is filtered, washed and concentrated to dryness in vacuo. The residue is taken up in methanol and brought to pH 6.4 with methanolic hydrogen chloride. The precipitate is separated by filtration and dried in air, resulting in preponderantly L-α-(3,4-dihydroxyphenyl)-α-hydrazinopropionic acid. The product is obtained after four recrystallizations from water containing 0.5% sodium bisulfite.

EXAMPLE 9

To a solution of 114.52 g. (0.50 mole) of 6-bromopiperonal [J. Chem. Soc., 111 946 (1917)] is added 67.5 g. (0.90 mole) of nitroethane, 4.1 ml. n-butylamine and 4.85 ml. of glacial acetic acid. The mixture is refluxed and water is removed azeotropically. After the theoretical amount of water has been distilled, distillation is continued and finished at room temperature in vacuo. Upon trituration of the residue with hexane, the β-methyl-β-nitrostyrene is obtained in a crystalline state. In general, however, the residue dissolved in toluene (90 ml.) is sufficiently pure for the next step.

To a mixture of 246 g. of 40-mesh iron, 5 g. of hydrated ferric chloride and 310 ml. of water, there is added 125 g. of nitroolefin in 90 ml. of toluene. The mixture is heated to reflux and 446 ml. of concentrated hydrochloric acid is added dropwise at such a rate as to maintain vigorous reflux. After the addition of acid is ended refluxing is continued for three hours. A siliceous filter aid is added and the mixture is filtered. The residue is washed with four 160 ml. portions of benzene. The combined benzene extracts are extracted with four 180 ml. portions of water. The benzene layer is stirred 1 hour with 415 ml. of 10% sodium bisulfite solution. The benzene phase is separated and washed with seven 180 ml. portions of water. The benzene extract is dried over magnesium sulfate and concentrated to yield 6-bromopiperonyl methyl ketone.

To 106 g. (0.4 mole) of ketone are added 228 ml. water, 75 ml. of 85% hydrazine hydrate and 29.5 g. of potassium cyanide. The mixture is stirred vigorously at room temperature for 18 hours. This mixture is separated by filtration and washed successively with three 60 ml. portions of water and three 50 ml. portions of ether. After drying at 25° C. in air and in vacuo DL-$\alpha$-(6-bromo-3,4-methylenedioxybenzyl) - $\alpha$ - hydrazinopropionitrile is obtained.

L-menthyloxyacetyl chloride (23.18 g., 0.1 mole) is added to a mixture of DL-hydrazinonitrile (29.82 g., 0.1 mole) in 100 ml. of pyridine. Pyridine hydrochloride is removed by filtration and the filtrate is concentrated in vacuo. The residue is crystallized from ethyl acetate to yield L-$\alpha$-(6-bromo-3,4-methylenedioxybenzyl)-L-$\alpha$ - N²-menthyloxyacetylhydrazinopropionitrile. The acid from the previous step (14.83 g., 0.03 mole) is stirred with fortified (45%) hydrochloric acid (100 ml.) at 0–10° C. The mixture is allowed to warm to room temperature over 2 hours then heated at reflux for 2 hours. The mixture is concentrated in vacuo to about 15 ml., filtered and the precipitate washed with ice-water and dried. The aminoacid hydrochloride is slurried with water (50 ml.) and diethylamine added to reach pH 6.0. After stirring for 1 hour at room temperature the mixture is filtered, washed and dried to yield the L-$\alpha$-hydrazinopropionic acid. This acid is refluxed with constant boiling hydrobormic acid and worked up to yield L-$\alpha$-(6-bromo-3,4-dihydroxybenzyl) - $\alpha$ - hydrazinopropionic acid. To the bromohydrazino-acid (3.05 g., 0.01 mole) described above in 100 ml. of dioxane is added 1 g. of palladium-on-carbon and triethylamine (1.51 g., 0.015 mole). The mixture is hydrogenated at 1 atm. and room temperature until the uptake of hydrogen is 0.01 mole. The mixture is filtered, the catalyst and triethylamine-hydrobromide washed and the filtrate concentrated to dryness. The residue is recrystallized from water to yield L-$\alpha$-(3,4-dihydroxybenzyl)-$\alpha$-hydrazinopropionic acid, M.P. 208° dec.

When $\beta$-nitrostyrene is used in place of $\beta$-methyl-$\beta$-nitrostyrene in the above procedure, the product prepared is L-$\beta$-(3,4-dihydroxyphenyl)-$\alpha$-hydrazinopropionic acid.

EXAMPLE 10

L-3,4-dihydroxyphenylalanine sesquihydrate (112 g., 0.5 mole), phenylnitrosomethane dimer (60.57 g., 0.25 mole) and 500 ml. of toluene are placed in a flask and refluxed. By means of a Dean-Stark separator, water is azeotroped away and toluene is returned to the flask. When the theoretical amount of water (1.25 moles) is distilled L-$\alpha$-(benzylazo)-$\alpha$ - (3,4 - dihydroxybenzyl)propionic acid is obtained on concentration of the mixture to dryness in vacuo at a temperature <50° C. To the azo compound in 5 l. of ether is added 122.94 g. of tetrachloro-O-benzoquinone in 1.5 l. of ether. The mixture is stirred at 25° C. for 24 hours. After filtration, drying and recrystallization from methanol, L-$\beta$-3,4-benzoquinolyl-$\alpha$-benzylazopropionic acid is obtained.

The acid (31.23 g., 0.1 mole) in 300 ml. methanol containing 3 g. polyvinyl alcohol-20, 1 g. platinum oxide and 3 g. vanadium (II) chloride is hydrogenated at 1 atm. pressure and 80° C. until the uptake of hydrogen is 0.3 mole. The mixture is cooled to room temperature, filtered, the precipitate washed and the filtrate taken to dryness in vacuo. The residue is recrystallized once from water and a second time from water containing 0.5% sodium bisulfite to yield L-$\alpha$-(3,4-dihydroxyphenyl)-$\alpha$-hydrazinopropionic acid.

When L-$\alpha$-methyl-3,4-dihydroxyphenylalanine is used in place of L-3,4-dihydroxyphenylalanine in the above example, the product obtained is L-$\alpha$-(3,4-dihydroxybenzyl)-$\alpha$-hydrazinopropionic acid.

EXAMPLE 11

A mixture of 3,4-dibenzyloxybenzaldehyde (159.2 g., 0.5 mole), rhodanine (69.0 g., 0.518 mole) and anhydrous sodium acetate (103.6 g., 1.265 moles) in 276 ml. of acetic acid is heated at reflux with stirring for 30 minutes. The mixture is poured into 1.4 l. of boiling water, stirred at 95 to 100° C. for 10 minutes and then cooled to 20° C. The product is separated by filtration, washed with water and dried in vacuo at 50° C. to yield 5-(3',4'-dibenzyloxybenzylidene)rhodanine.

In 1 l. of water is dissolved the benzylidenerhodanine (173.3 g., 0.4 mole) purged with nitrogen and containing 120 g. (3 moles) of sodium hydroxide. The mixture is heated at 90–95° C. for 15 minutes, rapidly cooled to −15° C. and with strong cooling acidified all at once with 300 ml. of concentrated hydrochloric acid. The mixture is cooled to 5° C., filtered, the precipitate washed with four 100 ml. portions of ice-water and dried in vacuo at 50° C. to yield cis-trans 3,4-dibenzyloxy-$\alpha$-mercaptocinnamic acid.

The mercaptocinnamic acid (117.75 g., 0.3 mole) of the previous step is dissolved in 250 ml. of ethanol, under nitrogen with stirring. Hydrazine (95%, 20.25 ml., 0.6 mole) is added dropwise over 5 minutes. The mixture is heated to 60°, maintained with stirring for 15 minutes and cooled to 20°. The product is separated by filtration, washed with four 75 ml. portions of cold ethanol and two 75 ml. portions of ether and dried in vacuo at 50° to yield hydrazinium cis-trans 3,4-dibenzyloxy-$\alpha$-hydrazinocinnamate. The $\alpha$-hydrazinocinnamate is the tautomeric equilibrium with the $\alpha$-hydrazinodihydrocinnamate.

Methylene iodide (107.2 g., 0.4 mole) and iodine (0.30 g., 0.0012 mole) are added to a mixture of zinc-copper couple (32.6 g. zinc, 0.5 mole) and 330 ml. of anhydrous ether. The ether is refluxed for 30 minutes after the addition is complete. A mixture of hydrazinium salt (84.5 g., 0.2 mole) in 200 ml. of dimethoxyethane is added and the mixture refluxed for 30 hours. The mixture is concentrated in vacuo to remove ether and dimethoxyethane. The residue is extracted with 500 ml. of hot methanol. The precipitate is washed with two 100 ml. portions of hot methanol. The methanolic filtrate is concentrated to about half-volume saturated with gaseous hydrogen chloride and allowed to stand at room temperature for 40 hours. The mixture is concentrated to dryness in vacuo and the residue taken up in chloroform-water with the pH of the water layer adjusted to 6 by addition of sodium bicarbonate. The chloroform layer is washed successively with water and saturated salt solution, dried over sodium sulfate and concentrated to dryness in vacuo. The residue is recrystallized from methanol-water to yield methyl DL-$\beta$-dibenzyloxyphenyl - $\alpha$ - hydrazinocyclopropanecarboxylate.

The ester from the previous step (60.67 g., 0.15 mole) and methyl L-menthyloxyacetate (18.25 g., 0.08 mole) in 200 ml. of methanol is refluxed for 4 hours. The mixture is concentrated to dryness in vacuo, taken up in ether-water, extracted with dilute (1 N) hydrochloric acid, water, 5% sodium bicarbonate and saturated salt solution. The ethereal solution is concentrated to dryness and the residue is crystallized from ethyl acetate-n-hexane to yield methyl L-$\beta$-dibenzyloxyphenyl-$\alpha$-N²-L-menthyloxyacetylhydrazinocyclopropanecarboxylate.

The ester from the previous step (18.0 g., 0.03 mole) is refluxed with 54 ml. of 2 N hydrochloric acid for 3 hours. The mixture is concentrated to dryness in vacuo. The residue is taken up in chloroform-water, washed with 5% sodium bicarbonate, water and saturated salt solution and the chloroform layer dried over sodium sulfate. After concentration in vacuo to dryness the residue is crystallized from methanol-water to yield L-$\beta$-(3,4-dibenzyloxyphenyl)-$\alpha$-hydrazinocyclopropanecarboxylic acid.

The dibenzyloxy compound of the previous step (9.13 g., 0.03 mole) is dissolved in 100 ml. of methanol and hydrogenated over 1 g. of Raney nickel at 25° C. and at 1 to 3 atms. pressure until the uptake of hydrogen is 0.09 mole. The mixture is filtered, the precipitate washed and the filtrate concentrated to dryness. L-$\alpha$-(3,4-dihydroxybenzyl)-$\alpha$-hydrazinopropionic acid is recrystallized from water containing 0.5% sodium bisulfite to yield a product, M.P. 208° C. dec.

EXAMPLE 12A

DL-$\alpha$-hydroxymethyl-3,4-dimethoxyphenylalanine [U.S. Pat. No. 3,395,176] (25.5 g., 0.1 mole) is stirred with 100 ml. pyridine and 50 ml. of acetic anhydride. The mixture is warmed to 90° C. and maintained for 1 hour. The mixture is cooled, poured onto ice and extracted with ether. The ether extract is dried and concentrated to dryness in vacuo.

The L-$\beta$-acetoxy-$\alpha$-N-acetylamino-$\alpha$-(3,4-dimethoxybenzyl)propionic acid is obtained from the DL-racemate by means of the quinine salt.

To a slurry of 80 ml. of water, 160 ml. of ether, 29 ml. of concentrated hydrochloric acid and 65 g. (0.2 mole) of L-$\beta$-acetoxy-$\alpha$-N-acetylamino-$\alpha$-(3,4-dimethoxybenzyl)propionic acid at 0–10° C. is added dropwise with vigorous stirring 14.5 g. (0.21 mole) of sodium nitrate in 30 ml. of water. The temperature is maintained at 0–10° C. during addition and during one hour of stirring. The ether layer is then separated, the water layer extracted with two 100 ml. portions of ether, the combined ethereal extract is washed with saturated salt solution and the ethereal extract dried over magnesium sulfate. The mixture is concentrated in vacuo to yield L-$\beta$-acetoxy-$\alpha$-N-nitroso-N-acetylamino-$\alpha$-(3,4-dimethoxybenzyl)propionic acid.

A mixture of 65.5 g. (1.0 mole) of zinc dust and 100 ml. of water is cooled to 10° C. While stirring, 53 g. (0.15 mole) of the above nitroso compound in 100 ml. of glacial acetic acid is added while maintaining the temperature at 10–15° C. After addition is finished, the mixture is allowed to warm to room temperature over one hour and then warmed to 80° C. in the steam-bath. The mixture is filtered to remove unreacted zinc, and the precipitate washed with three 25 ml. portions of warm 2 N hydrochloric acid. The combined filtrate is cooled to room temperature and with cooling basified to pH 6.5. The mixture is filtered and the precipitate dried. The residue is extracted with three 200 ml. portions of chloroform. The dried magnesium sulfate extract is concentrated in vacuo to residue which is L-$\beta$-acetoxy-$\alpha$-N$^1$-acetylhydrazino-$\alpha$-(3,4-dimethoxybenzyl)propionic acid.

A mixture of L-$\beta$-acetoxy-$\alpha$-N$^1$-acetylhydrazino-$\alpha$-(3,4-dimethoxybenzyl)propionic acid (35.4 g., 0.1 mole) in 200 ml. of acetic acid is refluxed with 100 g. of 50% hydriodic acid and 25 g. of red phosphorous for 4 hours. Insolubles are removed by filtration and the filtrate concentrated to dryness in vacuo. The residue is dissolved in 500 g. of methanol and treated with 5 g. of ethylene oxide. The mixture is concentrated and water added as the methanol boils away. As soon as some crystals form, the mixture is allowed to cool spontaneously to room temperature then chilled at 0 to 5° C. for 1 hour. The product is separated by filtration, washed and dried. Recrystallization from water containing a small amount of bisulfite yields analytically pure L-$\alpha$-(3,4-dihydroxybenzyl)-$\alpha$-hydrazinopropionic acid, M.P. 208° C.

EXAMPLE 12B

A mixture of L-$\beta$-acetoxy-$\alpha$-N-acetylamino-$\alpha$-(3,4-dimethoxybenzyl)propionic acid (33.9 g., 0.1 mole) and sodium hydroxide (12 g., 0.3 mole) is refluxed for 2 hours in 1 l. of water. The mixture is cooled to room temperature, acidified to pH 3 with concentrated hydrochloric acid and extracted with chloroform. The dried sodium sulfate-chloroform extract is concentrated to dryness in vacuo and the residue recrystallized from methanol-water to yield L-$\alpha$-N-acetylamino-$\alpha$-(3,4-dimethoxybenzyl)-$\beta$-hydroxypropionic acid. This material is recrystallized from methanol-water. By the procedure of Example 12A, this compound is nitrosated and the nitroacetylamino compound reduced with powdered zinc.

To a stirred mixture of L-$\alpha$-N$^1$-acetylhydrazino-$\alpha$-(3,4-dimethoxybenzyl)-$\beta$-hydroxypropionic acid (31.2 g., 0.1 mole) in 100 ml. of pyridine is added dropwise at $-10$ to 0° C. 18.95 g. (0.07 mole) of phosphorous tribromide. After 4 hours of stirring at room temperature, the mixture is allowed to warm to 25° C. and the stirring continued overnight.

To the mixture is added, with stirring, 100 ml. of water and stirring is continued for 2 hours. The mixture is concentrated in vacuo to yield L-$\alpha$-N$^1$-acetylhydrazino-$\alpha$-(3,4-dimethoxybenzyl)-$\beta$-bromopropionic acid. The residue is taken up in chloroform-water, washed with dilute acid, water and finally salt solution. After drying over magnesium sulfate, the mixture is concentrated in vacuo. The product is recrystallized from methanol-water or it may be used directly.

The residue (37.5 g., 0.1 mole) is then heated in a sealed tube with 500 ml. of concentrated hydrochloric acid as in Example 7 to obtain L-$\alpha$-hydrazino-$\alpha$-(3,4-dihydroxybenzyl)-$\beta$-hydroxypropionic acid which is used directly.

The residue is taken up in 200 ml. acetic acid and refluxed with 100 g. of 50% hydriodic acid and 25 g. of red phosphorous for 4 hours. The remainder of this preparation is completed as in Example 12A.

EXAMPLE 12C

L-$\alpha$-N$^1$-acetylhydrazino-$\alpha$-(3,4-dimethoxybenzyl)-$\beta$-bromopropionic acid (37.5 g., 0.1 mole) is dissolved in 100 ml. of methanol and gaseous hydrogen chloride is added until saturated. The mixture is stirred at room temperature for 24 hours and then evaporated to dryness in vacuo. The residue is recrystallized from methanol-ethyl acetate.

Methyl L-$\alpha$-N$^1$-acetylhydrazine-$\alpha$-(3,4-dimethoxybenzyl)-$\beta$-bromopropionate (38.8 g., 0.1 mole) is mixed with 6.0 g. of sodium methylate in 100 ml. of methanol and the mixture refluxed for 5 hours. The mixture is cooled, 100 ml. of water is added followed by addition of hydrochloric acid to pH 8. After concentration to dryness in vacuo the residue is taken up in chloroform-water, the chloroform extracted, washed, dried over magnesium sulfate and concentrated to dryness in vacuo. The residue is crystallized from methanol-water to yield methyl L-$\alpha$-N$^1$-acetylhydrazine-$\alpha$-(3,4-dimethoxybenzyl)-$\beta$-methoxypropionate.

A mixture of the above compound (34.0 g., 0.1 mole) in 200 ml. of acetic acid is refluxed with 100 g. of 50% hydriodic acid and 25 g. of red phosphorous for 4 hours. The workup is completed as described heretofore to yield L-$\alpha$-(3,4-dihyroxybenzyl)-$\alpha$-hydrazinopropionic acid.

EXAMPLE 13

To a mixture of copper (II) sulfate (159.6 g., 1.0 mole) and L-alanine (178.2 g., 2.0 moles) dissolved in water (700 ml.) is added with stirring 10 N sodium hydroxide (200 ml.) to pH 8. The mixture is allowed to cool spontaneously and stand overnight. It is further cooled to 5° C., filtered, washed and dried to yield copper (II) L-alanate (monohydrate).

To an ice-cold slurry of copper (II) L-alanate monohydrate (193 g., 0.75 mole) in water (2 l.) is added successively with stirring hydroxylamine-O-sulfonic acid (169.64 g., 1.5 moles) and 2.5 N sodium hydroxide to pH 8. After 10 minutes of stirring at 0–5°, the mixture is heated with stirring at 90° C. for one hour. The mixture is concentrated to half-volume in vacuo, cooled to 0–5° C. and allowed to stand overnight. The mixture is filtered and the precipitate washed with a little ice-water. On drying in vacuo at 110° C., copper (II) L-α-hydrazinopropionate is obtained.

Copper (II) L-α-hydrazinopropionate (134.87 g., 0.5 mole) is stirred with pyridine (1.5 l.) and to the stirred mixture is added to 45–50° C. acetic anhydride (750 ml.). The mixture is maintained at 45 to 50° C. for six hours, concentrated to dryness in vacuo and the residue recrystallized from 50% acetic acid to yield copper (II) L-α-$N^2$-acetylhydrazinopropionate.

To copper (II) L-α-$N^2$-acetylhydrazinopropionate (35.38 g., 0.1 mole) in 2 l. of water at 25° C. are added with stirring sodium carbonate (11.2 g., 0.113 mole) and vanillin (38.1 g., 0.25 mole). The mixture is stirred for 18 hours at room temperature and heated to 50° C. with stirring. The mixture is cooled to 20° C., brought to pH 7 with 2 N sulfuric acid and extracted with three 2 l. portions of ether. The aqueous portion is taken to dryness in vacuo and the residue leached in a Soxhlet extractor with methanol. The methanol extract is concentrated to dryness to yield a mixture of copper (II) L-α-$N^2$-acetylhydrazinopropionate and copper (II) predominantly L-erythro and threo-α-hydrazino-α-methyl-β-hydroxy-β-(4-hydroxy - 3-methoxyphenyl)propionate. The residue is hydrolyzed and reduced in a mixture of 100 ml. of 57% hydriodic acid and 40 g. of red phosphorous. The preparation is worked up as in Example 12A and the product recrystallized three times from water containing a small amount (0.5%) of bisulfite to yield L-α-(3,4-dihydroxybenzyl)-α-hydrazinopropionic acid.

EXAMPLE 14

DL-3-(3,4-dihydroxyphenyl)aniline (197.2 g., 1.0 mole) is slurried in 1 l. of pyridine at 25° C. With stirring and some cooling, acetic anhydride (400 g., 3.91 moles) is added. The temperature is allowed to rise to 45–50° C. and maintained in this range during the addition. The mixture is then heated on the steam-bath at 90–95° C. for one hour, concentrated to near dryness in vacuo and the residue taken up in chloroform-water. The chloroform solution is washed successively with 1 N hydrochloric acid, water and saturated salt solution. After drying over magnesium sulfate, the solution is concentrated in vacuo to yield O,O,N-triacetyl DL-3-(3,4-diacetoxyphenyl)-N-acetylalanine.

The triacetyl compound (220 g., 0.794 moles) from the previous step is slurried with a solution composed of 267 g. (3.16 moles) of sodium bicarbonate and 3 l. of water. The mixture is stirred at 25° C. for 24 hours, filtered and the filtrate acidified to pH 3.5 with concentrated hydrochloric acid. The mixture is concentrated in vacuo to about 300 ml., the residue allowed to stand at 0–5° C. for 18 hours, filtered and the precipitate washed with ice-water. The residue is recrystallized from water containing 0.5% sodium bisulfite and dried to yield N-acetyl-DL-3-(3,4-dihydroxyphenyl)alanine.

The acetylamino acid (150 g., 0.661 mole) from the previous step is dissolved in 1 l. of 2 N oxygen-purged sodium hydroxide. With cooling and stirring, benzyl chloride (253.18 g., 2.0 moles) is added while the temperature is maintained at 15 or 20°. The mixture is heated with stirring to 90° C. and to it added sodium hydroxide (80 g., 2 moles) and the resulting mixture, with stirring, is refluxed for 18 hours. An cooling to room temperature, the mixture is filtered, concentrated to about 300 ml. in vacuo and acidified with 6 N hydrochloric acid to pH 6.0. The mixture is allowed to stand at 0–5° C. for 1 hour, filtered, the precipitate washed with ice-cold water and dried in vacuo at 50° C. The residue is recrystallized from methanol-water to yield DL-β-(3,4-dibenzyloxyphenyl)alanine.

D-α-chlorophenylacetic acid (170.6 g., 1.0 mole), isopropyl alcohol (480.72 g., 8.0 moles) and 4.0 g. 2,4-dinitrobenzenesulfonic acid are refluxed for 30 hours. The residue is concentrated at atmospheric pressure. The mixture is cooled, taken up in ether, washed successively with water, 5% sodium bicarbonate water and saturated salt solution. After drying over magnesium carbonate, the ether is distilled at atmospheric pressure and the residue distilled in vacuo to yield isopropyl D-α-chlorophenylacetate.

To DL-β-(3,4-dibenzyloxyphenyl)alanine (188.7 g., 0.5 mole) in 1 l. of pyridine is added with stirring isopropyl D-α-chlorophenylacetate (106.3 g., 0.5 mole). The mixture is heated at reflux for 6 hours, cooled and concentrated to dryness in vacuo. The residue is taken up in ether and water, the ether layer extracted successively with water, dilute (1 N) hydrochloric acid, water and saturated salt solution. After drying over sodium sulfate, the mixture is filtered, washed and concentrated to dryness in vacuo. The residue is recrystallized from methanol-water to yield DL-β-(3,4-dibenzyloxyphenyl)-N-L-(O-isopropyl-α-phenylacetate)alanine.

The substituted alanine (165.8 g., 0.3 mole) is converted to the N-nitroso analog, and to the sydnone as previously described in Example 4 to yield 4-(3',4'-dibenzyloxybenzyl) - 3 - L-(O-isopropyl-α-phenylacetate) sydnone.

The sydnone (56.5 g., 0.1 mole) from the previous step is dissolved in 5 l. of methanol and hydrogenated over Raney nickel at room temperature and 1 atm. pressure until the uptake is 0.5 mole of hydrogen. The mixture is filtered, concentrated to dryness in vacuo and the residue recrystallized from water. The product containing DL- and L-β-dihydroxyphenyl-α-hydrazinopropionic acid in preponderance is recrystallized from water to constant rotation to yield the pure L-enantiomorph.

When the starting material is 3-(3,4-dihydroxyphenyl)-α-methylalanine in place of 3-(3,4-dihydroxyphenyl)alanine, the product obtaine dis L-β-(3,4-dihydroxyphenyl)-α-hydrazinopropionic acid.

What is claimed is:
1. A compound of the formula:

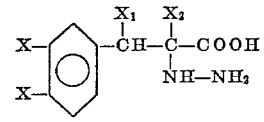

where
X is lower alkoxy and
  phenylalkoxy wherein the alkoxy contains from 1 to 4 carbon atoms; and
$X_1$ is hydrogen
  lower alkyl
  hydroxylower alkyl or
  halolower alkyl;
$X_2$ is hydrogen or
  lower alkyl.

2. α-(3,4-dibenzyloxybenzyl) - α - hydrazinopropionic acid.

References Cited
UNITED STATES PATENTS 3,625,950   12/1971   Cragoe et al. _____ 260—521 A LORRAINE A. WEINBERGER, Primary Examiner L. A. THAXTON, Assistant Examiner U.S. Cl. X.R.

260—155, 192, 239 E, 298, 326.3, 343.9, 396 R, 438.1, 455 R, 465 E, 471 A, 475 R, 476 R, 490, 516, 518 R, 518 A, 559 H, 999, 340.5